(12) United States Patent
Goh et al.

(10) Patent No.: US 10,086,958 B2
(45) Date of Patent: Oct. 2, 2018

(54) CONTROL MOMENT GYROSCOPE MODULE FOR SATELLITES

(71) Applicant: ST ELECTRONICS (SATCOM & SENSOR SYSTEMS) PTE. LTD., Singapore (SG)

(72) Inventors: Moses James Goh, Singapore (SG); Robert Devasahayam, Singapore (SG)

(73) Assignee: ST Electronics (Satcom & Sensor Systems) Pte. Ltd., Singapore (SG)

( * ) Notice: Subject to any disclaimer, the term of this patent is extended or adjusted under 35 U.S.C. 154(b) by 13 days.

(21) Appl. No.: 15/317,449

(22) PCT Filed: Nov. 3, 2014

(86) PCT No.: PCT/SG2014/000514
§ 371 (c)(1),
(2) Date: Dec. 9, 2016

(87) PCT Pub. No.: WO2015/190996
PCT Pub. Date: Dec. 17, 2015

(65) Prior Publication Data
US 2017/0121037 A1    May 4, 2017

(30) Foreign Application Priority Data

Jun. 11, 2014 (SG) .............................. 10201403151S

(51) Int. Cl.
*G01C 19/02*    (2006.01)
*B64G 1/28*    (2006.01)
(Continued)

(52) U.S. Cl.
CPC ............... *B64G 1/286* (2013.01); *B64G 1/10* (2013.01); *G01C 19/02* (2013.01); *G01C 19/04* (2013.01)

(58) Field of Classification Search
CPC ........... B64G 1/286; B64G 1/10; G01C 19/04
See application file for complete search history.

(56) References Cited

U.S. PATENT DOCUMENTS 3,105,657 A    10/1963  Mueller et al.
4,651,576 A *  3/1987   Luke ..................... G01C 19/04
                                                      318/473
(Continued)

*Primary Examiner* — Jake Cook
(74) *Attorney, Agent, or Firm* — Porter, Wright, Morris & Arthur, LLP

(57) ABSTRACT

A control moment gyroscope (CMG) module for use in a satellite comprising a CMG, the CMG comprising a flywheel assembly mounted on a gimbal assembly, the flywheel assembly comprising a flywheel rim, a flywheel spokes member and a flywheel shaft, the flywheel rim circumscribing the flywheel shaft, and the flywheel spokes member extending between the flywheel shaft and the flywheel rim. The gimbal assembly comprises at least one gimbal and a spin motor, the spin motor for rotating the flywheel assembly about a first axis. The CMG further comprises a torque shaft and a torque motor for rotating the at least one gimbal about a second axis. The CMG module further comprises a hermetic first shell housing; and a hermetic second shell housing; wherein the second shell housing is joined to the first shell housing by a hermetic seal to form an airtight interior of the CMG module, the interior of the CMG module containing the CMG.

18 Claims, 10 Drawing Sheets

(51) Int. Cl.
*B64G 1/10* (2006.01)
*G01C 19/04* (2006.01)

(56) References Cited

U.S. PATENT DOCUMENTS

| | | |
|---|---|---|
| 8,312,782 B2 | 11/2012 | McMickell et al. |
| 8,596,151 B2 | 12/2013 | Anderson |
| 2002/0040950 A1* | 4/2002 | Staley ................ B64G 1/28 244/165 |
| 2007/0069081 A1* | 3/2007 | Roder ................ B64G 1/283 244/165 |
| 2010/0064828 A1* | 3/2010 | Gisler ................ B64G 1/286 74/5.95 |
| 2011/0209568 A1* | 9/2011 | Anderson ............ B64G 1/286 74/5.4 |

\* cited by examiner

CONTROL MOMENT GYROSCOPE MODULE FOR SATELLITES

FIELD OF THE INVENTION

The invention pertains to a Control Moment Gyroscope (CMG) module for use in satellites.

BACKGROUND

Satellites use attitude actuators to orient themselves while in orbit. An example of an attitude actuator is a reaction wheel and a momentum wheel. Another example of an attitude actuator is a Control Moment Gyroscope (CMG). It has been well documented that CMGs are superior to reaction wheels in that they require less maneuver time, provide higher torque and consume less power. Furthermore, as CMGs operate on the principle of using the gimbal to incite torque on the satellite, the spinning wheel can be maintained at higher speeds, as compared to reaction wheels, which require a change in the speed of the wheel to incite torque on the satellite.

FIG. 1 shows a CMG. The CMG includes flywheel 1 mounted on gimbal 2. Flywheel 1 rotates about first axis A1 by spin motor 3 and gimbal 2 rotates about second axis A2 by torque motor 4. As flywheel 1 spins, the rotation of gimbal 2 tilts the angular momentum of flywheel 1. As gimbal 2 tilts, the changing angular momentum causes a gyroscopic torque that rotates the satellite.

However due to their design, CMGs are usually heavier and larger than reaction wheels, and are therefore are only suitable for large satellites, and not small satellites. Small satellites usually use reaction wheels and therefore do not reap the advantages conferred by CMGs. Therefore, there exists a need to adapt CMGs for use with small satellites by reducing the mass and volume of CMGs.

There also exists a need to design a housing for the CMG. The objective of the housing is not only to provide additional protection for the CMG, but also to maintain a vacuum-less environment for the CMG to operate in.

SUMMARY OF INVENTION

According to a first aspect of the invention, a control moment gyroscope (CMG) module for use in a satellite is described, the CMG module comprising a CMG. The CMG comprises a flywheel assembly mounted on a gimbal assembly, the flywheel assembly comprising a flywheel rim, a flywheel spokes member and a flywheel shaft, the flywheel rim circumscribing the flywheel shaft, and the flywheel spokes member extending between the flywheel shaft and the flywheel rim. The gimbal assembly comprises at least one gimbal and a spin motor, the spin motor for rotating the flywheel assembly about a first axis. The CMG further comprises a torque shaft and a torque motor for rotating the at least one gimbal about a second axis. The CMG module further comprises a hermetic first shell housing; and a hermetic second shell housing; wherein the second shell housing is joined to the first shell housing by a hermetic seal to form an airtight interior of the CMG module, the interior of the CMG module containing the CMG.

Preferably, the interior of the CMG module further contains an inert gas.

Preferably, the inert gas is helium.

Preferably, the CMG module further comprises at least one vibration isolator within the interior of the CMG module, the at least one vibration isolator mounted on an inner surface of the first shell housing or on an inner surface of the second shell housing.

Preferably, the flywheel spokes member comprises a center portion and elongate spokes that extend radially from the center portion.

Preferably, the at least one gimbal has a cavity region and an I-beam cross-section.

Preferably, the first shell housing and the second shell housing has a hemisphere-like shape.

Preferably, the hermetic seal is formed by using a gasket and/or an epoxy adhesive.

Preferably, the gasket is an O-ring.

Preferably, the CMG module has an egg-like profile.

Preferably, the pressure maintained within the interior of the CMG module is in the range of 50 mbar to 150 mbar.

According to a second aspect of the invention, a satellite containing at least one CMG module is described.

The invention will now be described in detail with reference to the accompanying drawings.

BRIEF DESCRIPTION OF THE DRAWINGS

The accompanying figures illustrate disclosed embodiment(s) and serve to explain principles of the disclosed embodiment(s). It is to be understood, however, that these drawings are presented for purposes of illustration only, and not for defining limits of the application.

Exemplary, non-limiting embodiments of the present application will now be described with references to the above-mentioned figures.

DETAILED DESCRIPTION

Figure 1:
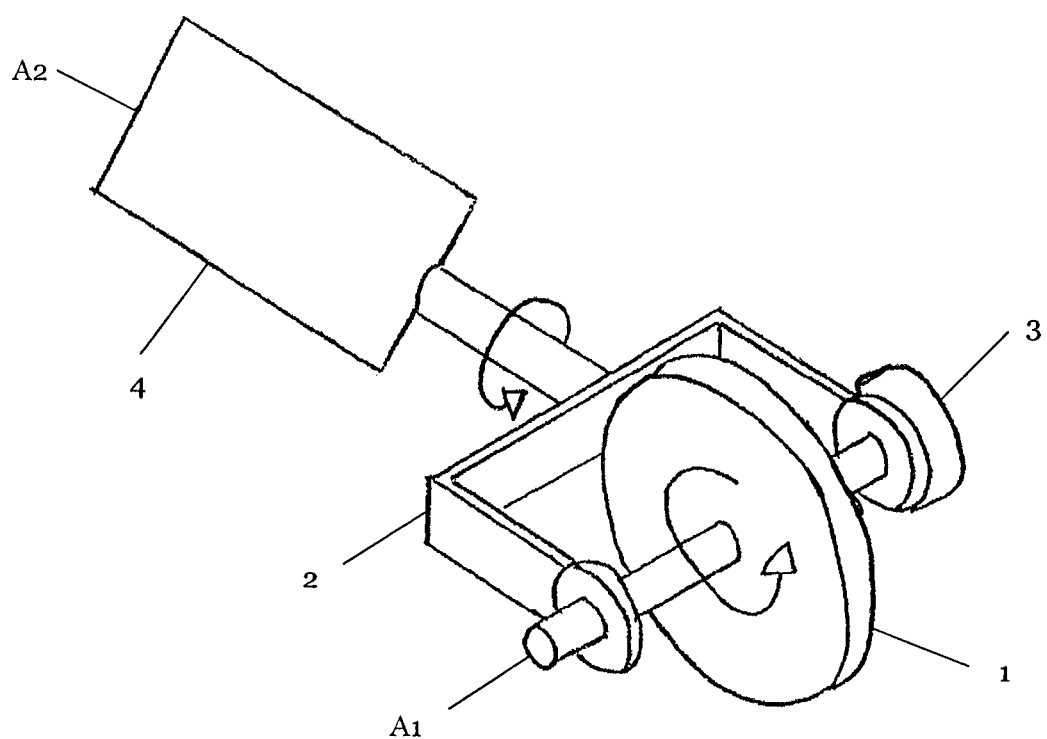
FIG. 1 is a perspective view of a basic CMG to explain a principle of the CMG.
Figure 2:
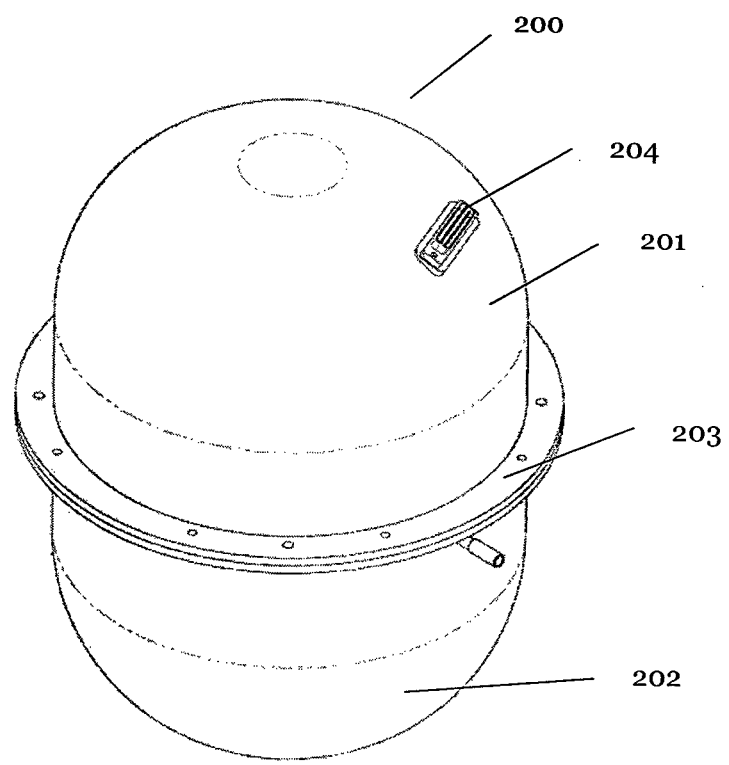
FIG. 2 is a perspective view illustrating a CMG module according to an exemplary embodiment of the present invention.

FIG. 2 illustrates Control Moment Gyroscope (CMG) module 200 in accordance with an exemplary embodiment of the present invention. CMG module 200 comprises first shell housing 201, second shell housing 202 and a CMG (not visible as the CMG is within CMG module 200).

First shell housing 201 and second shell housing 202 can be substantially shaped like a hemisphere. First shell housing 201 and second shell housing 202 can be dimensionally similar. First shell housing 201 and second shell housing 202 can have open ends, and through these open ends, the CMG is received within CMG module 200. CMG module 200 can have a diameter of 265 millimeters and can have a height of 300 millimeters. Preferably, CMG module 200 has an egg-like profile.

First shell housing 201 and second shell housing 202 are designed such that their open ends can be mated together. The open ends of first shell housing 201 and second shell housing 202 can be joined with gasket 203 creating a hermetic seal between first shell housing 201 and second shell housing 202. Preferably, gasket 203 can be an O-ring. Alternatively, the open ends of first shell 201 and second shell 202 can be joined with an epoxy adhesive, without requiring gasket 203. The epoxy adhesive can be Bacon Compound 103. Bacon Compound 103 is qualified by NASA for its out-gassing properties. Furthermore, the thermal expansion properties of Bacon Compound 103 are near to that of Aluminum. Preferably, both gasket 203 and the epoxy adhesive can be used in conjunction to create the hermetic seal between first shell housing 201 and second shell housing 202.

First shell housing 201 and second shell housing 202 can be made up of a metal that is high in strength while remaining lightweight. Preferably, first shell housing 201 and second shell 202 is made up of Aluminum 7075-T6. First shell housing 201 and second shell housing 202 can have a wall thickness of 2 mm. First shell housing 201 and second shell housing 202 and its hermetic seal form a hermetic protective capsule to house the CMG.

As the CMG is housed within CMG module 200, CMG module 200 protects the CMG from any loose debris within the satellite. It also ensures that in the event that the CMG is damaged, the loose components of the CMG do not in turn damage the components of the satellite.

First shell housing 201 and second shell housing 202 and the hermetic seal between first shell housing 201 and second shell housing 202 form an airtight environment, preventing air/gas within CMG module 200 from escaping into the interior of the satellite, thereby preventing the interior of CMG module 200 from being a vacuum. The fact that there is air/gas within CMG module 200 (and therefore not a vacuum), reduces the evaporation rate of any lubricants used in the CMG. It also improves the heat transfer among the components of the CMG.

Preferably, the air/gas in the interior of CMG module 200 is an inert gas. The advantage of inert gases is that they will not react with any lubricants used in the CMG. Preferably, the inert gas is helium. As the molecular weight of helium is low, therefore, the drag force caused by helium is low. Therefore, a flywheel assembly spinning in an environment filled with helium is advantageous, as it will not significantly increase the windage (force created on an object by friction when there is relative movement between air and the object) loss for the flywheel assembly.

Preferably, the pressure maintained within CMG module 200 is in the range of 50 mbar to 150 mbar. This range is significant as the pressure within CMG module 200 should be relatively low without reaching hard vacuum. If the pressure is too high, this would also increase the windage loss.

CMG module 200 also comprises electrical power socket 204. Electrical power socket 204 connects to an electrical power source in the satellite to drive the CMG.

First shell housing 201 and second shell housing 202 have inner surfaces. Preferably, vibration isolators 406 (see FIG. 4) are mounted on the inner surfaces of first shell housing 201 and second shell housing 202. Vibration isolators 406 have a dual purpose. Firstly, vibration isolators 406 prevent damage to any bearings used in the CMG, which may occur during the rocket launch. Secondly, vibration isolators 406 prevent the motion of the CMG from affecting the other components and sensors of the satellite. Vibration isolators 406 being mounted on the inner surfaces of first shell housing 201 and second shell housing 202 also allow for easier assembly of CMG module 200.

Figure 3:
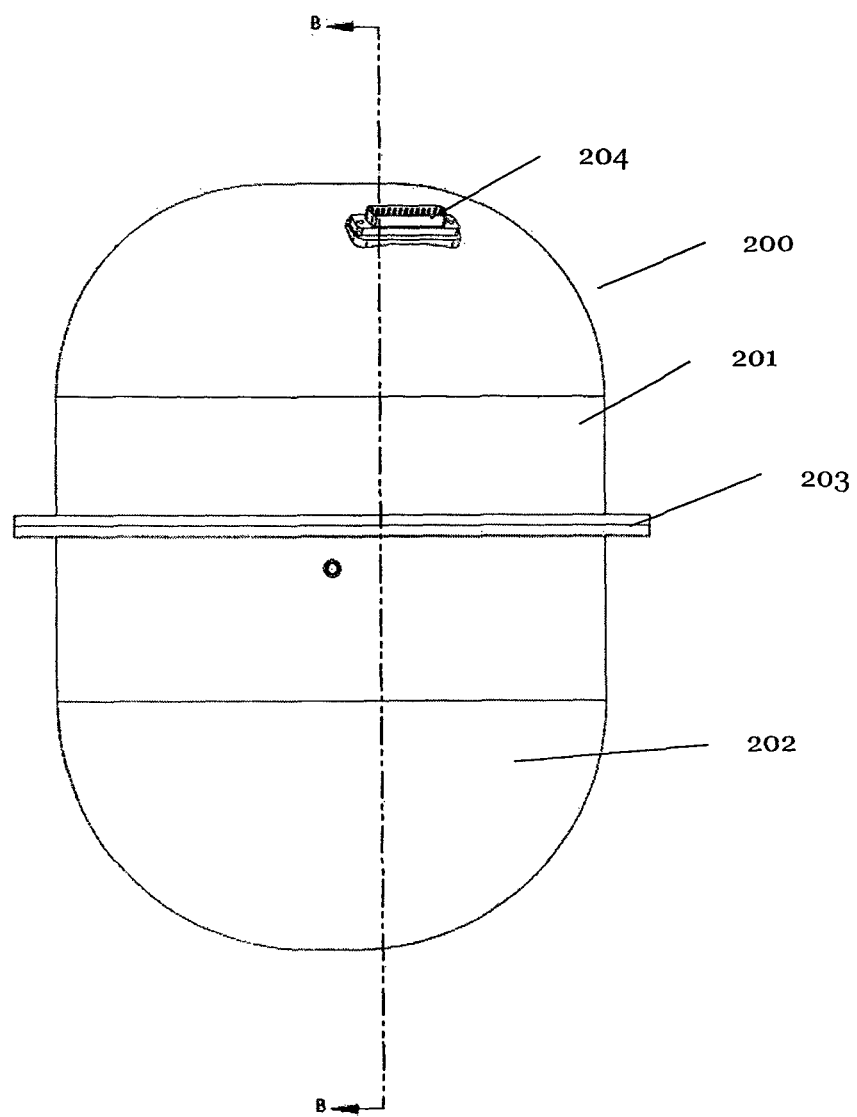
FIG. 3 is a side view illustrating a CMG module according to an exemplary embodiment of the present invention.
Figure 4:
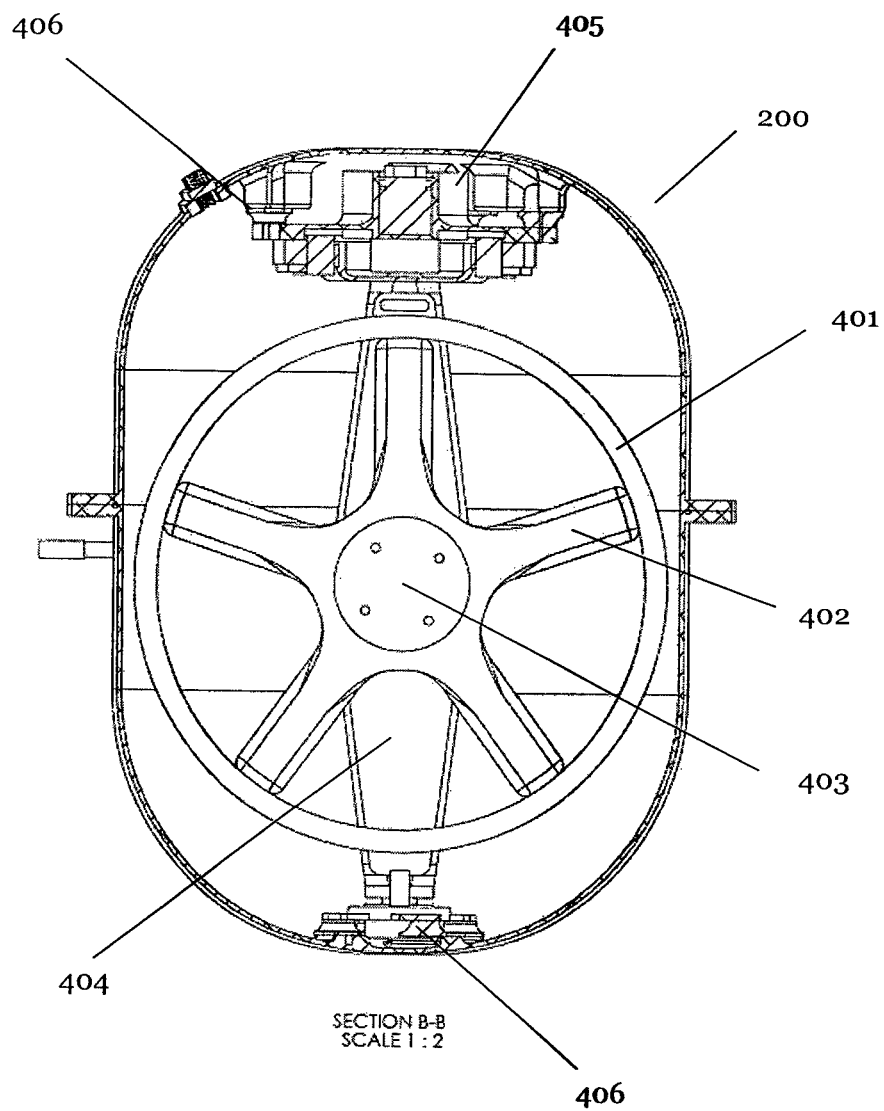
FIG. 4 is a cross-sectional view of FIG. 3 taken along the lines B-B.
Figure 5:
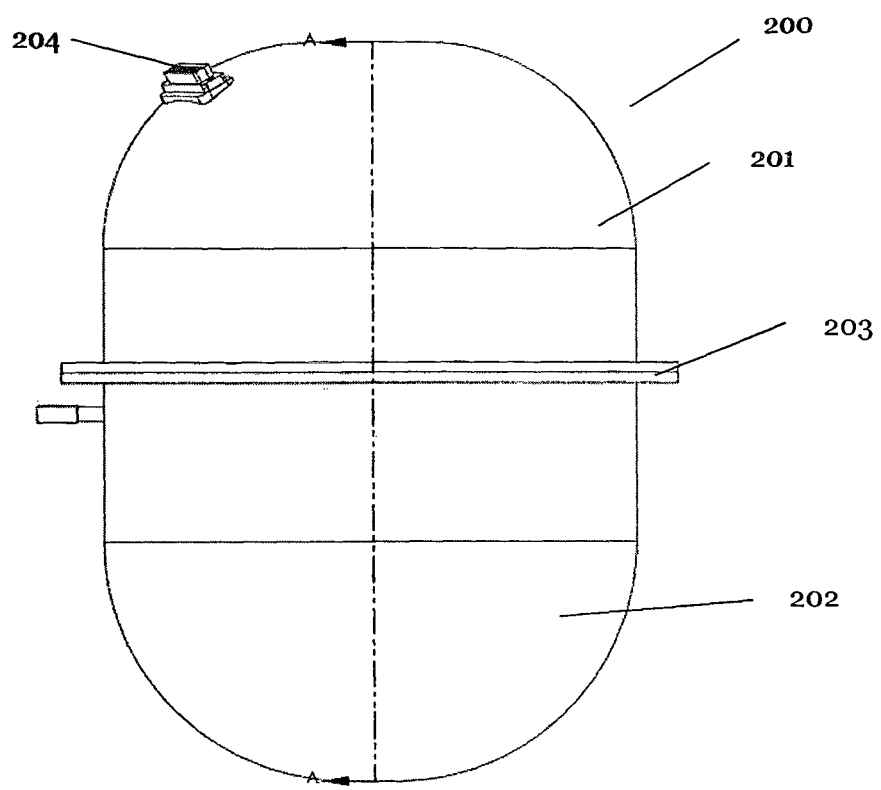
FIG. 5 is a side view illustrating a CMG module according to an exemplary embodiment of the present invention.

FIG. 3 shows a side view of CMG module 200. FIG. 4 is a cross-sectional view of FIG. 3 taken along the lines B-B. Within CMG module 200 is the CMG. The CMG comprises a flywheel assembly, a gimbal assembly, a gimbal torque assembly, a gimbal bearing assembly and torque shaft assembly.

Figure 8:
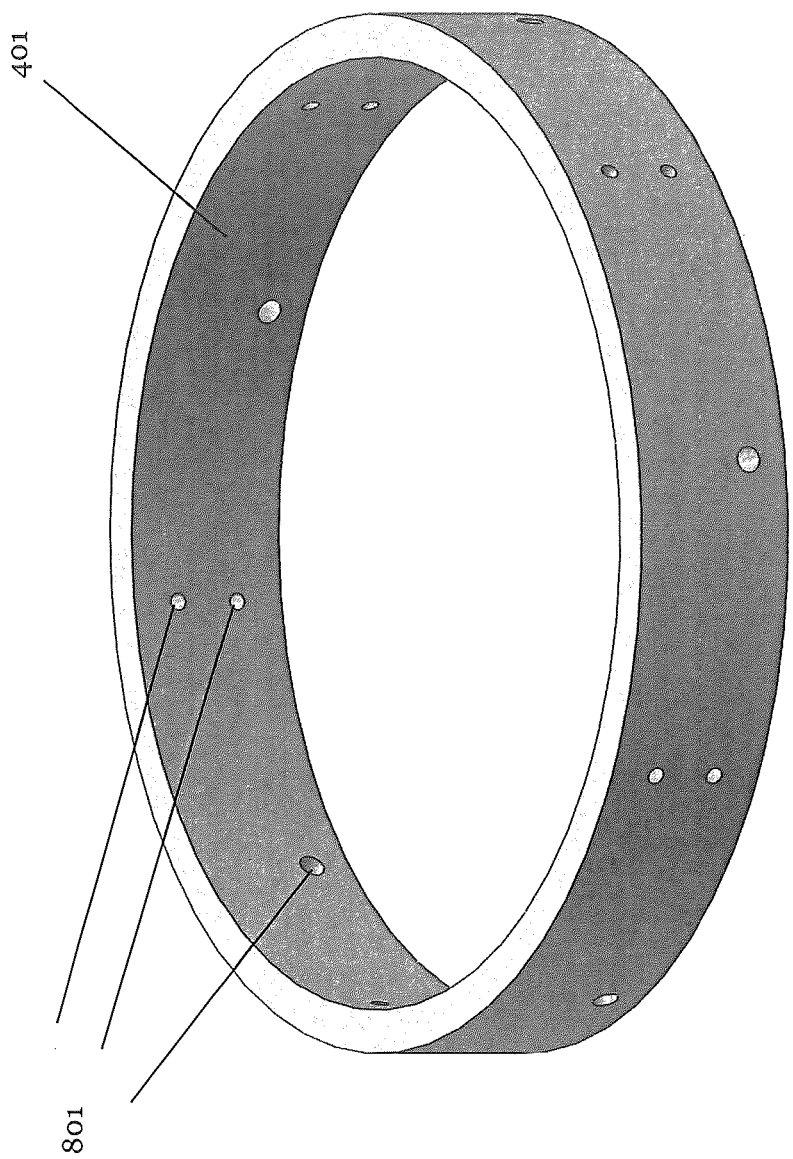
FIG. 8 is a perspective view illustrating a flywheel rim according to an exemplary embodiment of the present invention.

Referring to FIG. 4, the flywheel assembly comprises flywheel rim 401, flywheel spokes member 402 and flywheel shaft 403. Referring to FIG. 8, flywheel rim 401 preferably comprises a plurality of threaded holes 801. Through threaded holes 801, flywheel spokes member 402 can be attached to flywheel rim 401. Threaded holes 801 can also have balancing screws and masses to even out the weight of flywheel rim 401. Preferably, flywheel rim 401 is cylindrical in shape. Flywheel rim 401 can be made up of a material with high tensile strength. Flywheel rim 401 can be made up of an alloy steel such as SS 304 or SS 440C.

Figure 9:
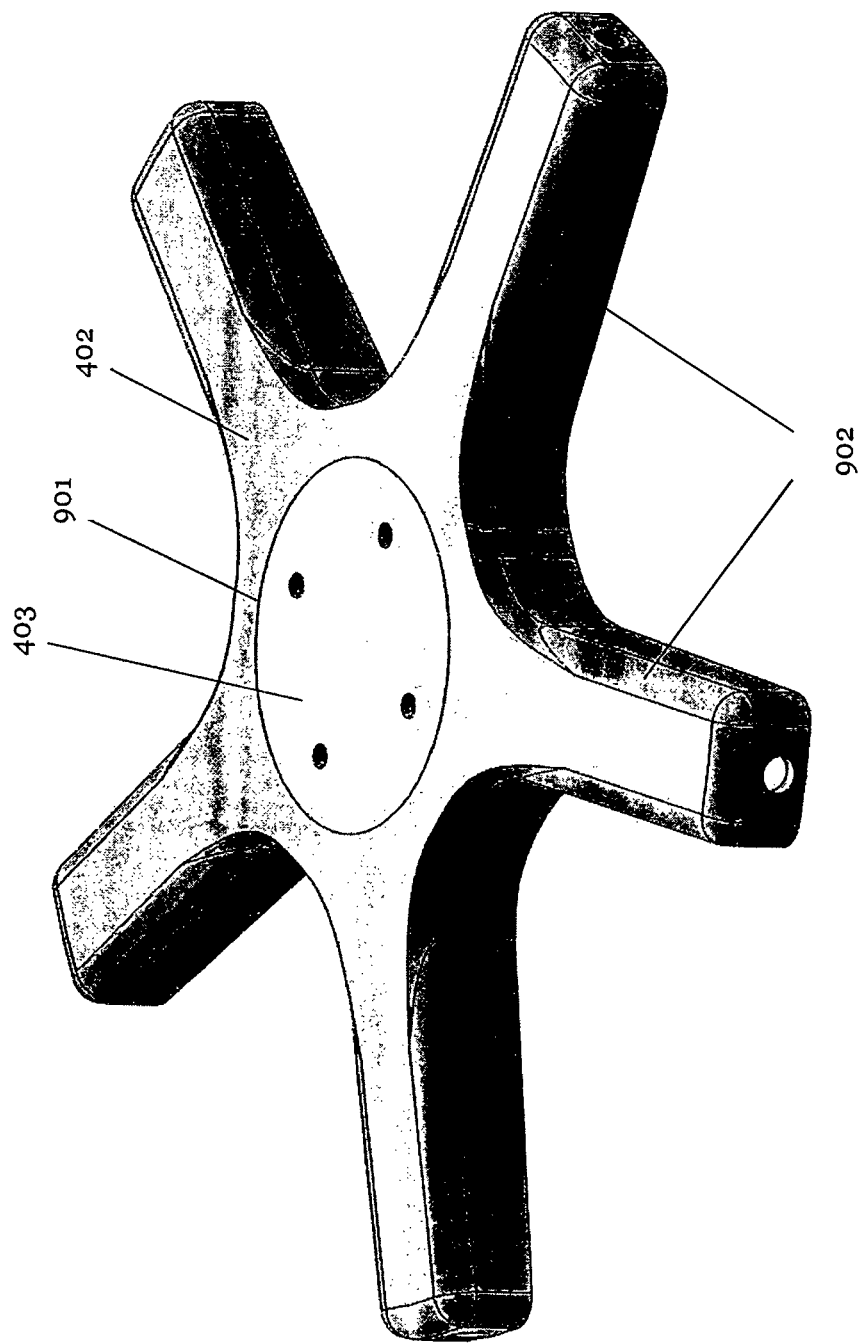
FIG. 9 is a perspective view illustrating a flywheel spokes member according to an exemplary embodiment of the present invention.

Referring to FIG. 9, flywheel spokes member 402 comprises center portion 901 and elongate spokes 902. Center portion 901 has a cavity which is depicted in FIG. 9 as being occupied by flywheel shaft 403. Elongate spokes 902 extend radially from center portion 901. Elongate spokes 902 can be made up of a material that is lightweight and has high strength. Elongate spokes 902 can be made up of Aluminum 7071-T6. Elongate spokes 902 can have a U-beam cross-section to maximize its strength.

In line with the objective to reduce the overall mass of the CMG, the mass of the flywheel assembly should therefore be reduced. This is even more pertinent as typically flywheels make up more than 50% of the entire mass of the CMG. For this reason, flywheel rim 401 and flywheel spokes member 402 have been designed and manufactured as two separate components. In this manner, design considerations can be made to maximize the mass of flywheel rim 401 while minimizing the mass of flywheel spokes member 402. Further, the flywheel assembly can be customizable to the size of the satellites.

The flywheel assembly is assembled by attaching flywheel rim 401 to flywheel spokes member 402. Flywheel rim 401 can be attached to flywheel spokes member 402 using five M6 bolts. Flywheel shaft 403 will then be attached to flywheel spokes member 402.

Figure 6:
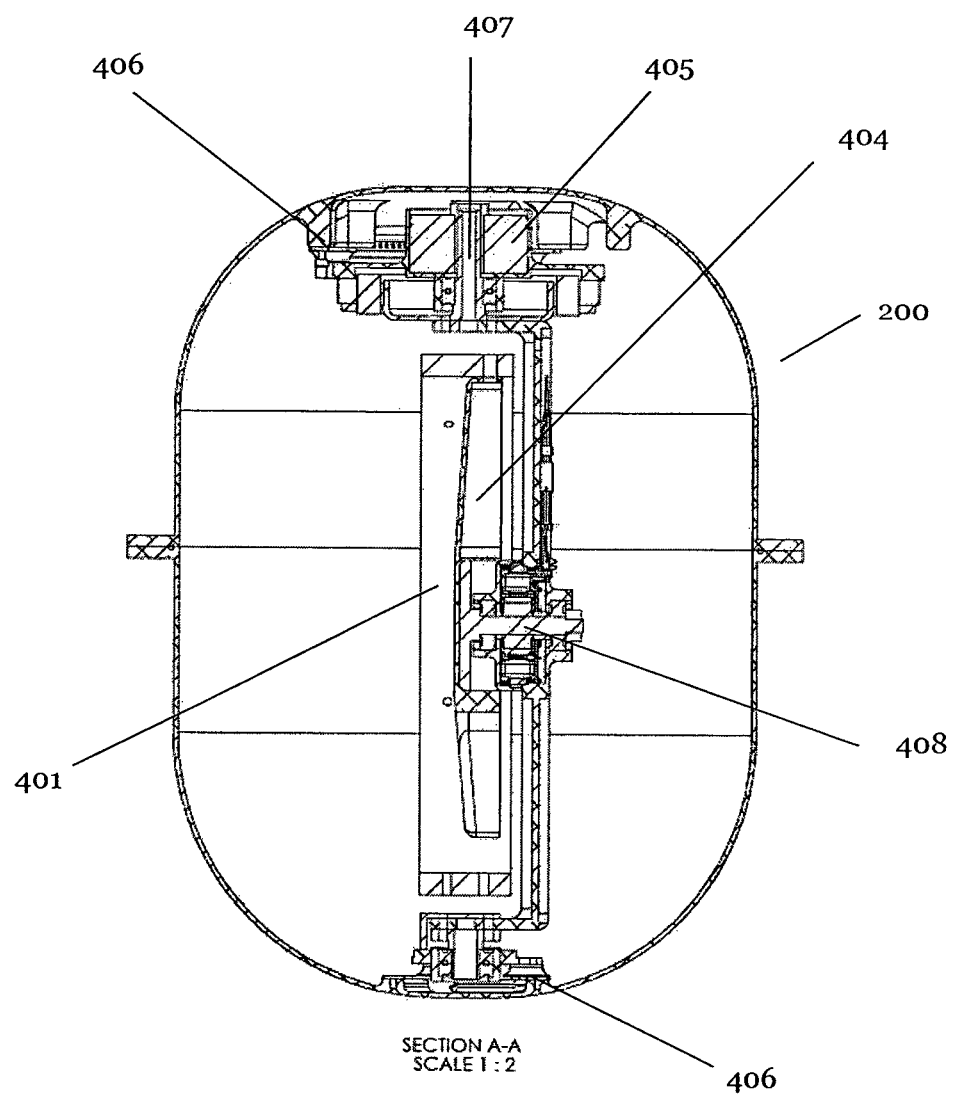
FIG. 6 is a cross-sectional view of FIG. 5 taken along the lines A-A.

The gimbal assembly comprises gimbal 404 (see FIG. 4) and spin motor 408 (see FIG. 6). In an alternative embodiment, the gimbal assembly may comprise a plurality of gimbals 404. Spin motor 408 rotates the flywheel assembly about a first axis. The flywheel assembly is mounted on gimbal 404 and gimbal 404 structurally supports flywheel assembly and its rotating motion. Torque motor 405 rotates gimbal 404 via torque shaft 407 about a second axis. Gimbal 404 also transfers torque from torque motor 405 to the flywheel assembly. In operation, as the flywheel assembly spins, gimbal 404 tilts the flywheel assembly's angular momentum. As the flywheel assembly tilts, the changing angular momentum causes a gyroscopic effect that results in a torque which rotates the satellite.

Figure 10:
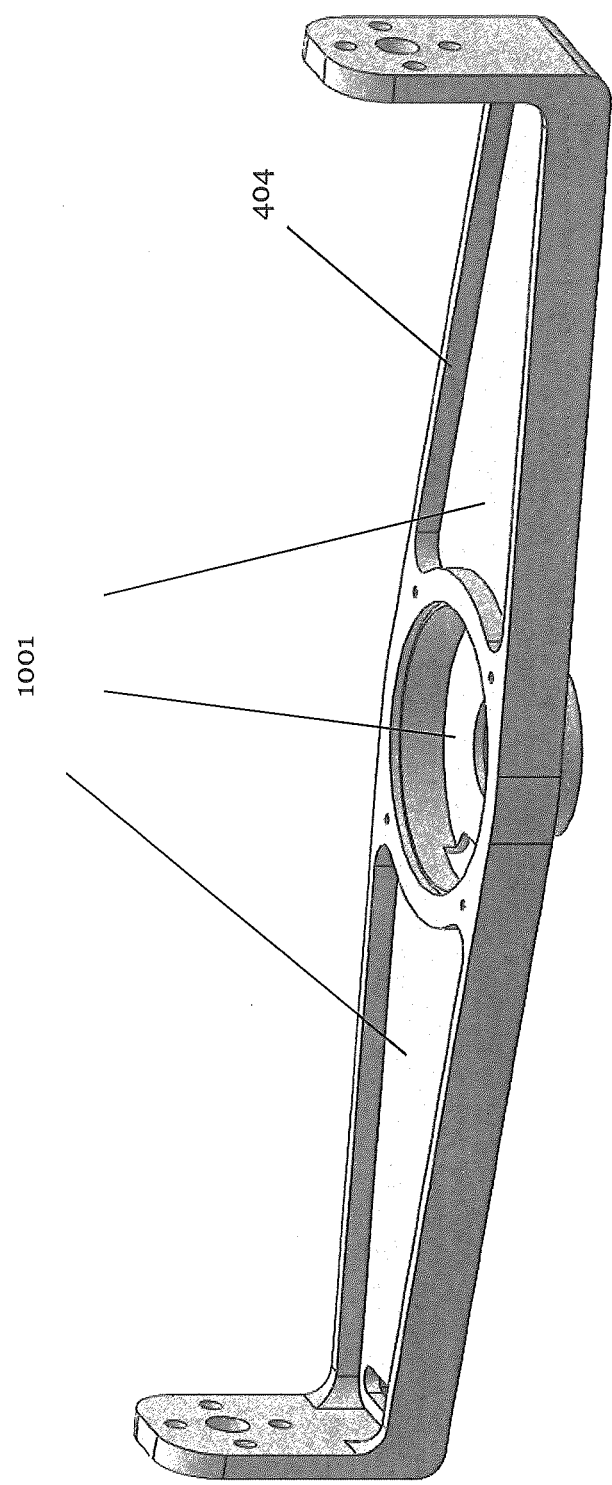
FIG. 10 is a perspective view illustrating a gimbal according to an exemplary embodiment of the present invention.

Gimbal 404 can be made out of a lightweight material having high strength. Preferably, gimbal 404 is made up of Aluminum 7075-T6. In line with the objective to reduce the overall mass of the CMG, the mass of gimbal 404 should therefore be reduced. Therefore, preferably, gimbal 404 has cavity regions 1001 to reduce the mass of gimbal 404 (see FIG. 10). Preferably, gimbal 404 has an I-beam cross-section. Preferably, gimbal 404 is symmetric about the center. Preferably, gimbal 404 has ribs.

The gimbal assembly can be assembled by press fitting bearings into the respective locations of gimbal 404, with the use of jigs and bench arbor. This can be followed by the placement of spin motor 408 into gimbal 404.

The gimbal torque assembly is assembled by press fitting bearings in their respective locations, with the use of jigs and bench arbor. The resolver is then also pressed fitted into its locations followed by torque motor 405 being bolted on to the torque motor adapter.

The gimbal bearing assembly is assembled by press fitting gimbal bearing into the bearing housing. After which, the cover is bolted on. The bearing side shaft is press fit into the gimbal bearing assembly.

The torque shaft assembly is assembled by press fitting the rotor of torque motor 405 on torque shaft 407.

Assembly of the CMG starts first with the gimbal torque assembly and the torque shaft assembly. Torque shaft 407 is slotted into the gimbal torque assembly, where the torque shaft adaptor would be used to secure torque shaft 407 to the gimbal torque assembly. Gimbal 404 is then mounted onto the torque shaft assembly with four bolts. The gimbal bearing is mounted on the opposite end of gimbal 404. The flywheel assembly is slotted through the center of the gimbal assembly and a nut is used to secure the flywheel assembly to the gimbal assembly. The torque adaptor is mounted on the torque side shell, after which the bearing side shell is used to enclose the module and is fastened to the torque side shell.

Figure 7:
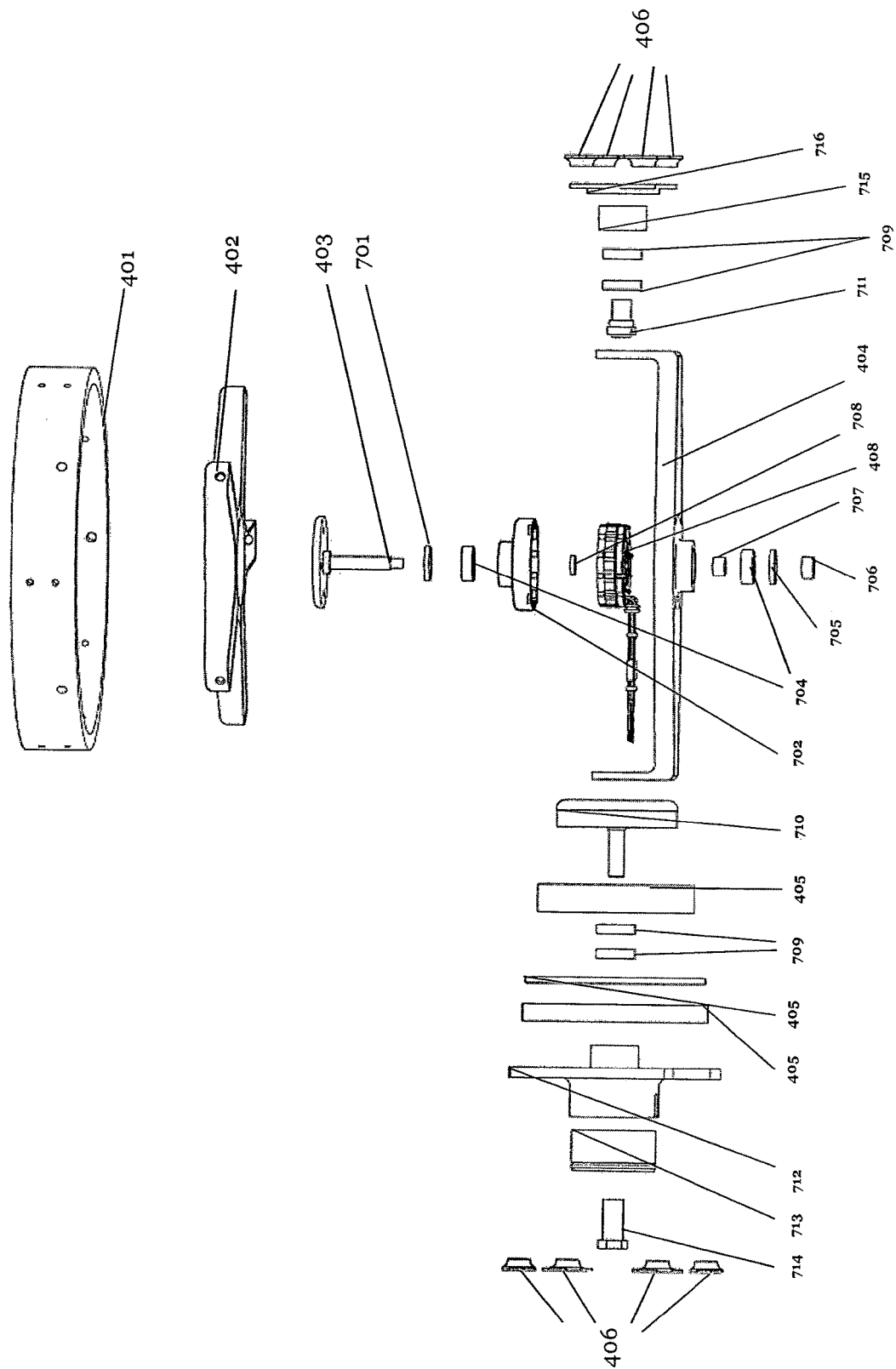
FIG. 7 is an exploded view of a CMG according to an exemplary embodiment of the present invention.

For an exploded view of the CMG, please refer to FIG. 7. FIG. 7 shows the following elements:
Flywheel rim 401
Flywheel spokes member 402
Flywheel shaft 403
Gimbal 404
Torque motor 405
Vibration isolator 406
Bearing locknut 701
Spin motor housing 702
Spin motor 408
Spin motor bearing 704
Bearing locknut 705
Flywheel adaptor (or shaft) locknut 706
Motor spacer bearing 707
Motor spacer flywheel 708
Gimbal bearing 709
Torque shaft 407
Bearing shaft 711
Torque motor housing 712
Resolver 713
Resolver adaptor 714
Bearing housing 715
Bearing housing adapter 716

CMG module 200 with first shell housing 201, second shell housing 202 and the CMG can be pre-assembled to allow for easy installation to the satellite. A satellite can have a plurality of CMG modules 200. The CMG modules 200 can be mounted on the floor of the satellite, and oriented at an angle from each other.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A control moment gyroscope (CMG) module for use in a satellite comprising:
 a single CMG, the CMG comprising:
  a flywheel assembly mounted on a gimbal assembly, the flywheel assembly comprising a flywheel rim, a flywheel spokes member and a flywheel shaft, the flywheel rim circumscribing the flywheel shaft, and the flywheel spokes member extending between the flywheel shaft and the flywheel rim;
  the gimbal assembly comprising at least one gimbal and a spin motor, the spin motor for rotating the flywheel assembly about a first axis; and
  a torque shaft and a torque motor for rotating the at least one gimbal about a second axis;
 a first shell housing;
 a second shell housing;
 wherein the second shell housing is joined to the first shell housing by a hermetic seal to form a hermetically-sealed housing having an airtight interior for containing the entire single CMG; and
 at least two vibration isolators supporting the single CMG within the airtight interior with a first one of the at least two vibration isolators mounted on an inner surface of the first shell housing at a closed end of the first shell housing and a second one of the at least two vibration isolators mounted on an inner surface of the second shell housing at a closed end of the second shell housing and wherein the first one and the second on of the at least two vibration isolators support opposed ends of the gimbal assembly.

2. The CMG module of claim 1 wherein the interior of the hermetically-sealed housing further contains an inert gas.

3. The CMG module of claim 2 wherein the inert gas is helium.

4. The CMG module of claim 1 wherein the flywheel spokes member comprises a center portion and elongate spokes that extend radially from the center portion.

5. The CMG module of claim 1 wherein the at least one gimbal has a cavity region and an I-beam cross-section.

6. The CMG module of claim 1 wherein the first shell housing and the second shell housing each has a hemispherical-shaped closed end.

7. The CMG module of claim 1 wherein the hermetic seal is formed by using a gasket and/or an epoxy adhesive.

8. The CMG module of claim 7 wherein the gasket is an O-ring.

9. The CMG module of claim 1 wherein the pressure maintained within the interior of the CMG module is in the range of 50 mbar to 150 mbar.

10. A satellite containing at least one CMG module, the at least one CMG module as defined in claim 1.

11. The satellite of claim 10 wherein the interior of the hermetically-sealed housing further contains an inert gas.

12. The satellite of claim 11 wherein the inert gas is helium.

13. The satellite of claim 10 wherein the flywheel spokes member comprises a center portion and elongate spokes that extend radially from the center portion.

14. The satellite of claim 10 wherein the at least one gimbal has a cavity region and an I-beam cross-section.

15. The satellite of claim 10 wherein the first shell housing and the second shell housing each has a hemispherical-shaped closed end.

16. The satellite of claim 10 wherein the hermetic seal is formed by using a gasket and/or an epoxy adhesive.

17. The satellite of claim 16 wherein the gasket is an O-ring.

18. The satellite of claim 10 wherein the pressure maintained within the interior of the CMG module is in the range of 50 mbar to 150 mbar.

\* \* \* \* \*